Figure 1:
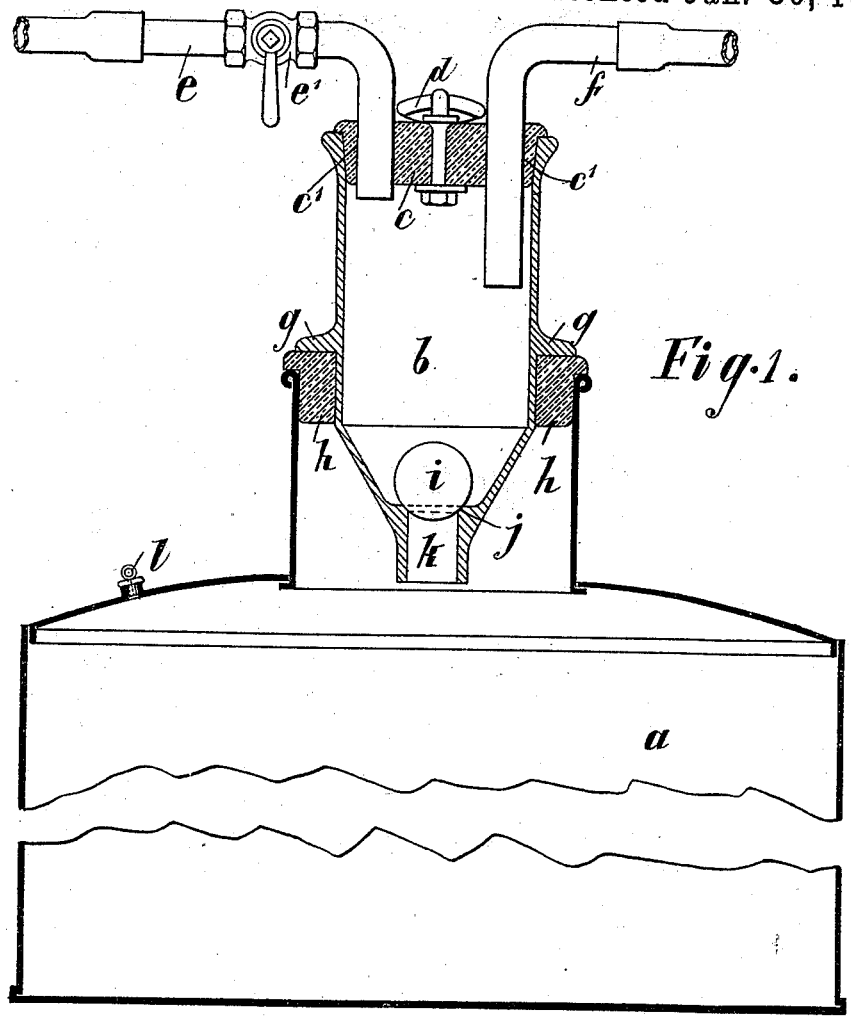

(No Model.) 4 Sheets—Sheet 1.
A. SHIELS.
VACUUM CONTROLLING APPARATUS FOR MILKING MACHINES.
No. 513,625. Patented Jan. 30, 1894.

Witnesses:
E. B. Bolton
E. K. Sturtevant

Inventor:
Alexander Shiels
By Richard
his Attorneys.

(No Model.) 4 Sheets—Sheet 2.

A. SHIELS.
VACUUM CONTROLLING APPARATUS FOR MILKING MACHINES.

No. 513,625. Patented Jan. 30, 1894.

Witnesses:
E. B. Bolton
E. K. Sturtevant

Inventor:
Alexander Shiels
By Richard A.
his Attorneys.

(No Model.) 4 Sheets—Sheet 3.

A. SHIELS.
VACUUM CONTROLLING APPARATUS FOR MILKING MACHINES.

No. 513,625. Patented Jan. 30, 1894.

Witnesses
E. B. Bolton
E. K. Sturtevant

Inventor:
Alexander Shiels
By
his Attorneys (No Model.) 4 Sheets—Sheet 4.
A. SHIELS.
VACUUM CONTROLLING APPARATUS FOR MILKING MACHINES.
No. 513,625. Patented Jan. 30, 1894.
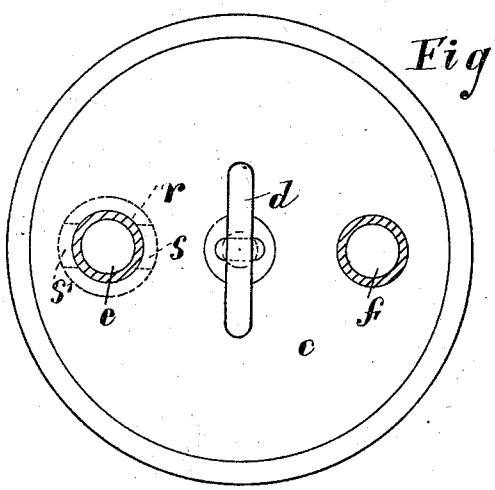
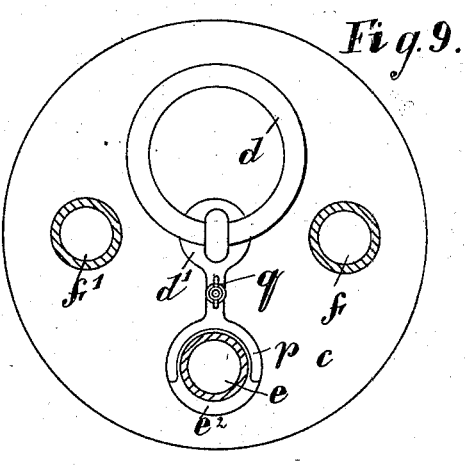
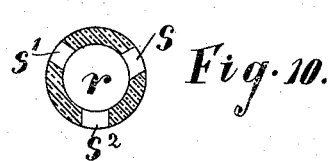
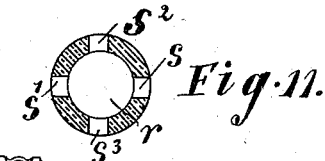
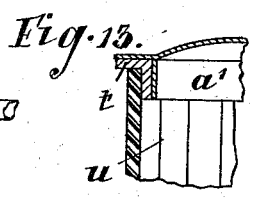
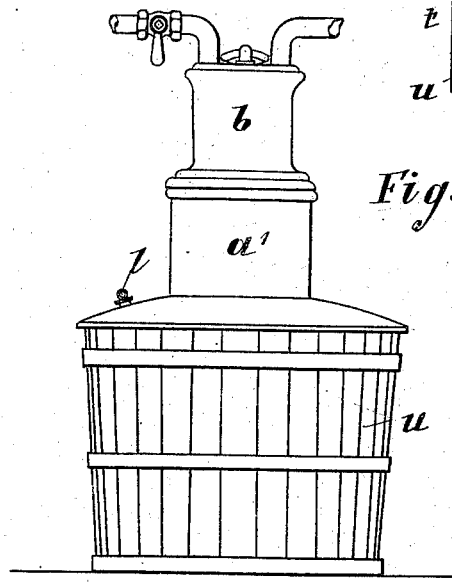
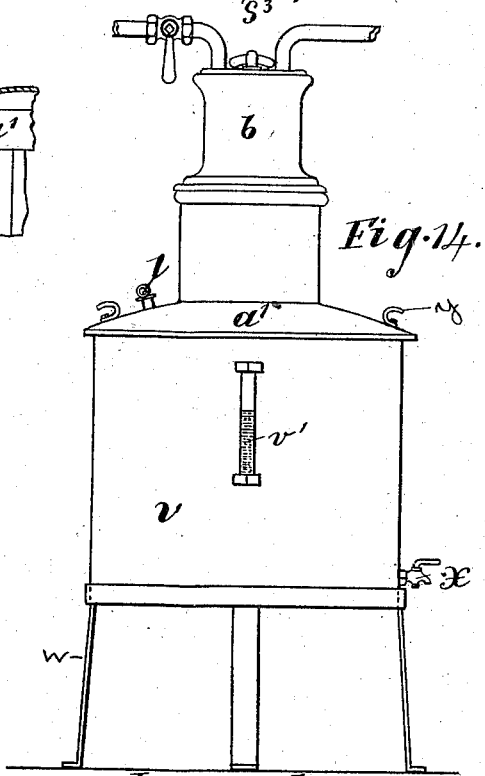
Witnesses:
E. B. Bolton
E. K. Sturtevant
Inventor:
Alexander Shiels
By Richards
his Attorneys

UNITED STATES PATENT OFFICE.

ALEXANDER SHIELS, OF GLASGOW, SCOTLAND.

VACUUM-CONTROLLING APPARATUS FOR MILKING-MACHINES.

SPECIFICATION forming part of Letters Patent No. 513,625, dated January 30, 1894.

Application filed April 29, 1893. Serial No. 472,358. (No model.) Patented in England April 27, 1892, No. 7,938.

*To all whom it may concern:*

Be it known that I, ALEXANDER SHIELS, M. B., C. M., B. Sc., a subject of the Queen of Great Britain, and a resident of the city of Glasgow, Scotland, have invented an Improved Vacuum-Controlling Apparatus to be Used in Connection with Milking-Machines, (for which I have obtained a patent in England April 27, 1892, No. 7,938,) of which the following is a specification.

This invention relates to milking machines, and it has for its object to save vacuum energy or power, by preventing the vacuum pulsations from being communicated to the milk pail or receptacle, so that the latter is kept uniformly at the maximum vacuum pressure.

The invention consists in fitting on, to, or in connection with the milk pail or receptacle, a small hollow vulcanite, glass, or metal controlling vessel, having, preferably, a tapered or coned bottom. From the inverted apex of the cone, is connected a pipe or branch which leads to, or projects into, the interior of the milk receptacle. The pipe connection may be made one with the vessel. The controlling vessel is or may be closed by a bung of vulcanized india-rubber or cork, or may have a cap or other suitable air-tight closing device. Through the bung, or the like, two pipes are led, one pipe being connected to the milking teat cups, and the other being connected to the pulsating machine or reservoir of vacuum. Both of these pipes are, or may be, fitted with suitable stop cocks or valves, for opening and closing the pipes. The pipe from the teat cups, is, by preference, made to project farther into the vessel than the other pipe. The plug may also be fitted with a ring or handle, or other suitable means for pulling it out of place, when desired. The controlling vessel may be fitted, on its outside, with a ring or washer, of india-rubber, cork or the like, to enable it to be fitted to milk cans or pails, air tight. The bottom of the vessel is, preferably, arranged so as to serve as a seat for a small ball or cone valve, or its equivalent. I prefer to use a small vulcanized india-rubber ball valve, having a specific gravity slightly less than the specific gravity of the milk, so that it will normally float in the milk. The ball valve is arranged to automatically close the pipe connection leading to the interior of the milk pail at the proper times.

In order that my said invention may be properly understood, I have hereunto appended four explanatory sheets of drawings, whereon—

Figure 2:
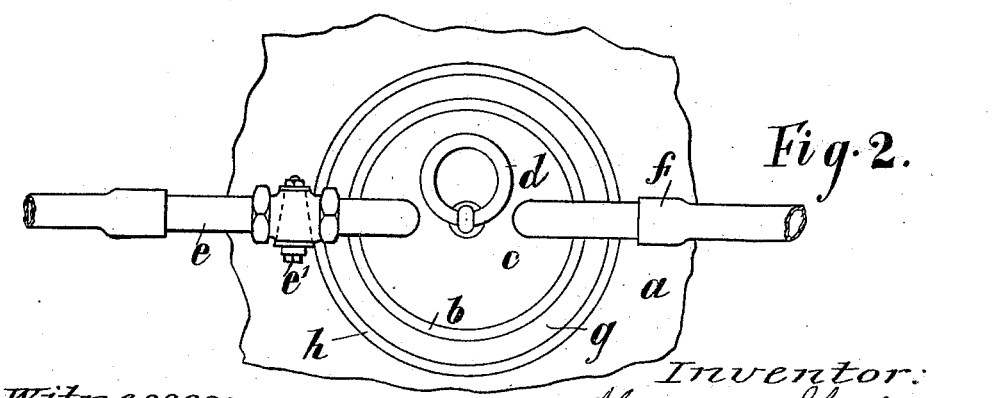
Figure 3:
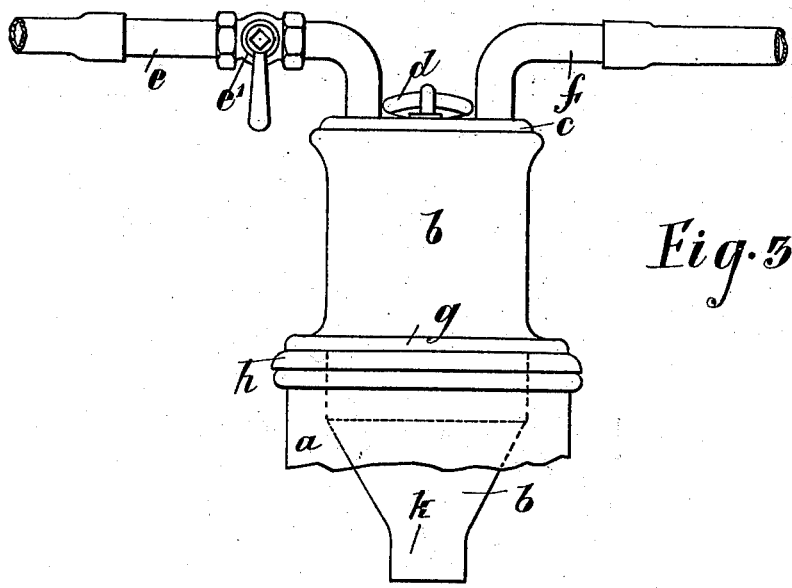
Figure 4:
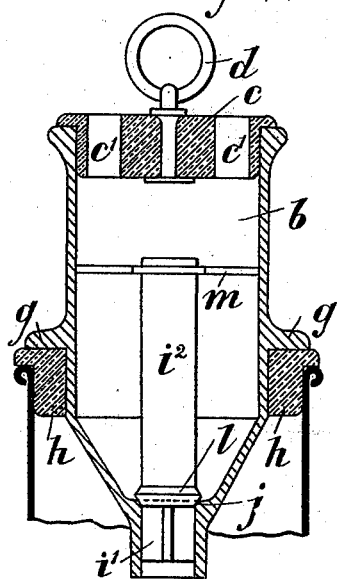
Figure 5:
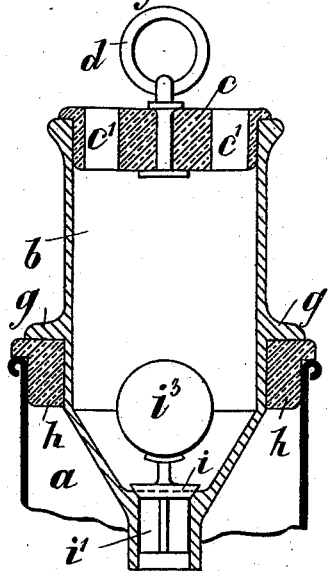
Figure 6:
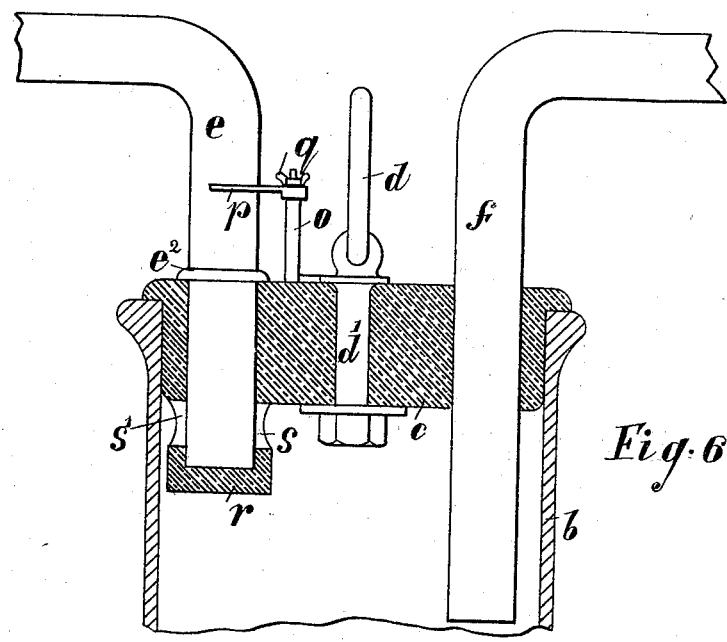
Figure 7:
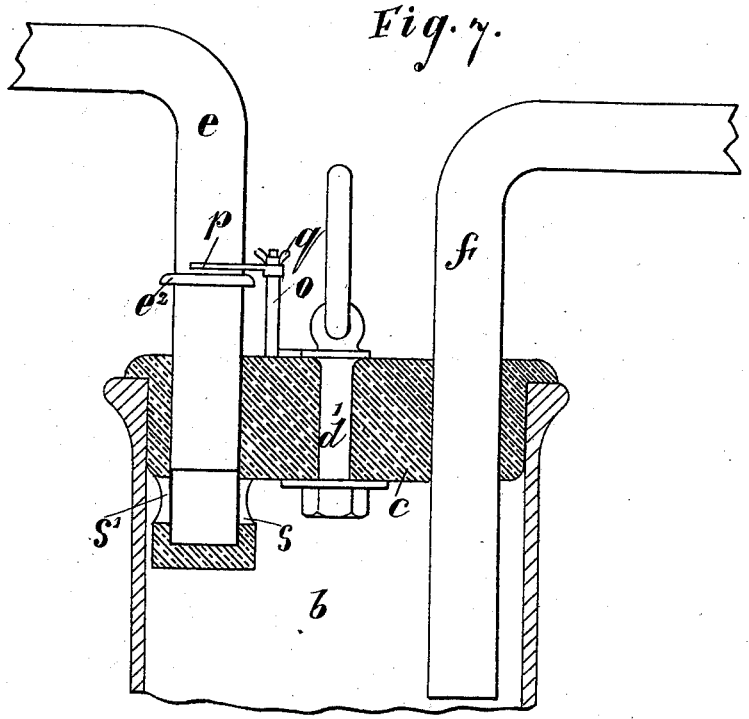

Figure 1 is a vertical section of a milk pail and controlling vessel. Fig. 2 is a plan view of the controlling vessel. Fig. 3 is a part side elevation of the controlling vessel. Figs. 4 and 5 show modified valve arrangements for the controlling vessel. Figs. 6 and 7 show an arrangement, wherein the vacuum tube connection is made to serve as a valve. Fig. 8 is a plan view of Fig. 6. Fig. 9 is a plan view of a controlling vessel, with two milking connections and one vacuum connection. Figs. 10 and 11 are detail sectional views. Fig. 12 shows a controlling vessel, fitted on an ordinary milk pail. Fig. 13 is a detail view. Fig. 14 shows a controlling vessel applied to a milk reservoir.

Referring to the drawings, whereon the same reference letters, wherever repeated, indicate similar or like parts, $a$ is the milk pail and $b$ the controlling vessel. The vessel $b$, which is preferably cylindrical in the body, with a bottom of inverted conic shape, may be made of vulcanite, metal, glass or any other suitable material.

Fitted in the top of the controlling vessel, is, preferably, an india-rubber bung $c$, which is or may be provided with a ring-handle $d$, for enabling it to be pulled out, when desired, so as to give access to the interior of the vessel for cleaning purposes. Passed through holes $c'$ in the bung are the bent ends of the pipe $e$, leading to the pulsating machine or vacuum reservoir, and the pipe $f$, leading to the teat cups of the milking machine. The controlling vessel $b$ is made with a flange $g$ round it, and this flange rests and bears on, preferably, a rubber washer $h$ inserted in the mouth of the milk pail or receptacle $a$. The lower end of the controlling device $b$, which passes air tight through the washer, as shown, has in the interior of the coned part, a circular seat $j$, upon which rests a light, preferably india-rubber, ball valve $i$.

$k$ is the outlet at the bottom of the controlling vessel.

$l$ is a small plug, fitted in the milk pail or receptacle $a$.

In Fig. 4 the valve $i$ is a ground metal valve with the usual triangular guide piece $i'$. The valve is, in this instance, provided with a tubular float $i^2$, which, at its upper end, passes through and is guided by a central hole in the guide bar or bridge $m$.

In Fig. 5, the valve is shown as having fitted to it, a ball float $i^3$.

The working of the apparatus is as follows:—Supposing that the vacuum pulsations of the milking machine, which may be a "Shiels and Elliot" machine, vary from five to fifteen pounds vacuum pressure, then, starting with a vacuum pressure of, say, fifteen pounds throughout the system, whenever communication is opened with the pulsator or vacuum reservoir, by means of the cock $e'$ on the pipe $e$, a vacuum pressure of fifteen pounds is produced in the controlling vessel and milk receptacle the valve $i$ being drawn from its seat to form the vacuum in the receptacle $b$, and, when, again, by the action of the pulsator, the vacuum pressure throughout the system is reduced to five pounds, the same reduction takes place in the controlling vessel $b$, but not in the milk receptacle $a$, for the reason that whenever the vacuum pressure in the controlling vessel falls, there is, as a consequence, a difference of vacuum pressure, equal to the amount of fall, between the pressure in the controlling vessel and that in the receptacle $a$, and, as the greater vacuum pressure is in the receptacle, the valve $i$ falls to its seat and is retained on its seat, by the lesser vacuum pressure in $b$ and so connection with the controlling vessel is cut off and vacuum prevented from leaking from the receptacle into said vessel. Milk, from the teat cups, flows, by the pipe $f$, into the controlling vessel $b$, but, since the valve $i$ is closed, it cannot gain access to the receptacle $a$, it accumulates in said vessel, with the vacuum, due to the pulsation, again rises throughout the system to fifteen pounds, when the valve $i$, owing to its specific gravity being lighter than that of the milk and to the fact that the vacuum pressures in the controlling device and milk receptacle, are now balanced, at once leaves its seat and floats in the milk. When the valve leaves its seat, the milk flows into the pail or receptacle through the opening $k$. Prior to this balancing of pressure, however, the valve is held on its seat by the greater pressure in the vessel $b$ exerted through the liquid upon the valve, said greater pressure being due to the lesser vacuum pressure in said vessel as compared with the more perfect vacuum in the milk pail. As will be seen, then, with this apparatus, the vacuum in the milk pail or receptacle is conserved during times of low pulsation, that is to say, of reduced vacuum in the teat cups, &c., instead of being reduced or entirely lost at such times, as in the present systems.

In the arrangement shown at Figs. 6, 7 and 8, instead of having a controlling valve $e'$ on the vacuum pipe $e$, the pipe itself is made to serve as the valve. To enable this to be done, a hollow downward extension $r$ of india-rubber is made on the bung $c$. This extension is made with passage ways $s$, $s'$, at each side of it. When it is desired to cut off communication between the pulsating apparatus or vacuum reservoir, and the controlling vessel, the pipe $e$ is pushed down into the extension $r$, as shown at Fig. 6, and so that the lower solid part of said extension, closes the bottom of tube $e$. To open communication, all that requires to be done is to pull up the pipe $e$, in the manner shown at Fig. 7, so that free communication takes place through the passages $s$, $s'$, in the extension $r$. To prevent the pipe $e$ being pulled out of place, a small ring $e^2$ is fitted on the pipe, which, when the pipe $e$ is pulled up, catches against a fork $p$, carried on a short pillar $o$, fitted on the bolt $d'$ of the ring $d$. Whenever it is desired to take the pipe $e$ out of the bung, the fork $p$ can be taken off by merely unscrewing the thumb screw $q$. Instead of the extension $r$ being made with only two passages $s$, $s'$ in it, it may be made with three or more passages, as shown in cross section at Figs. 10 and 11.

In Fig. 9 two pipes $f$, $f'$, from two sets of milking teats, are shown as fitted in the bung $c$.

In Fig. 12, the controlling vessel $b$ is shown as fitted in a metal top $a'$, which as shown at Fig. 13 has around its lower edge a rubber ring or washer $t$. The controlling vessel and top $a'$ can be fitted on to any ordinary wooden pail, such as $u$, Figs. 12 and 13, the rubber washer $t$ making a perfectly air-tight joint.

In Fig. 14 the controlling vessel $b$ and part $a'$ are shown as fitted in a large milk receptacle $v$, which is or may be provided with a gage glass $v'$, and from which milk can be drawn off at any time, by the cock $x$. If it is desired to draw off milk when the apparatus is in operation, then, it is necessary to pull out the bung $l$, and admit air to destroy the vacuum within the receptacle $v$.

$y$ are handles for lifting out the part $a'$.

$w$ are legs for supporting the receptacle $v$.

When it is desired to lift out the controlling vessel from the receptacle $a$ (Fig. 1), it is necessary to pull out the small bung $l$, so as to destroy the vacuum within said receptacle.

The controlling device may, if desired, be made in one with the milk pail or receptacle.

It is to be understood, that I do not confine myself to the precise form and construction of the controlling vessel and its appurtenances, as it can be further altered without departing from the principle of the invention.

The vessel $b$ constitutes the holder or casing for the valve and this casing in the present instance comprises the valve seat and the enlarged chamber or vessel $b$ adapted not only to contain the valve, but also to act as a vacuum chamber and as a liquid reservoir or container.

Having now fully described my invention, what I claim, and desire to secure by Letters Patent, is—

1. In vacuum milking machines, the milk receptacle, the milk pipe, the vacuum pipe, a hollow vessel interposed between the milk and vacuum pipes and the milk receptacle, and in communication with said pipes and receptacle and the valve in the interior of the hollow vessel constituting a vacuum chamber, arranged to control the passage between the same and the receptacle for automatically, at certain times, locking up or conserving the vacuum pressure within the receptacle, substantially as described.

2. In combination with the milk pipe and the vacuum pipe a valve casing comprising a valve seat and an enlarged chamber or vessel b the outlet leading from said vessel to connect with the interior of the milk pail, and the valve controlling the outlet, said pipes connecting with the interior of the vessel, said valve box having an air tight connection with the milk pail substantially as described.

3. In combination, the vacuum and milk pipes e, f, the chamber b connected therewith, said chamber having a conical bottom, adapted to be connected with the milk pail and the valve seated in said conical bottom, substantially as described.

4. In combination with the pail, the vessel b, the washer h extending around the chamber and seated against the mouth of the pail, the bung c in the top of the vessel b, the pipes e and f extending through said bung and the valve i seated in the vessel, substantially as described.

5. In combination, the vessel b leaving an outlet to be connected with the milk pail, the valve in said vessel, the milk pipe f, the movable pipe e, the extension r within the vessel arranged to close the end of the pipe and having passage ways s, and the bung carrying said extension, substantially as described.

In witness whereof I have hereunto signed my name, at Glasgow, Scotland, this 18th day of February, 1893.

ALEXANDER SHIELS.

Witnesses:
WM. GALL,
D. DEWAR.